(12) United States Patent
Oguma (10) Patent No.: US 12,262,108 B2
(45) Date of Patent: Mar. 25, 2025

(54) IMAGE PICKUP APPARATUS THAT PERFORMS IMAGE PICKUP CONTROL FOR CASE WHERE FACES OF MULTIPLE PERSONS ARE DETECTED AT THE TIME OF IMAGE PICKUP, CONTROL METHOD THEREFOR, AND STORAGE MEDIUM

(71) Applicant: CANON KABUSHIKI KAISHA, Tokyo (JP)

(72) Inventor: Kotaro Oguma, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 125 days.

(21) Appl. No.: 17/956,965

(22) Filed: Sep. 30, 2022

(65) Prior Publication Data

US 2023/0130745 A1    Apr. 27, 2023

(30) Foreign Application Priority Data

Oct. 21, 2021 (JP) ................................. 2021-172318

(51) Int. Cl.
| | |
|---|---|
| *H04N 23/611* | (2023.01) |
| *G03B 30/00* | (2021.01) |
| *H04N 23/53* | (2023.01) |
| *H04N 23/63* | (2023.01) |
| *H04N 23/69* | (2023.01) |
| *H04N 23/698* | (2023.01) |

(52) U.S. Cl.
CPC ......... *H04N 23/611* (2023.01); *H04N 23/633* (2023.01); *H04N 23/69* (2023.01); *G03B 30/00* (2021.01); *H04N 23/53* (2023.01); *H04N 23/698* (2023.01)

(58) Field of Classification Search
CPC .... H04N 23/611; H04N 23/633; H04N 23/69; H04N 23/53; H04N 23/698; H04N 23/635; H04N 23/64; H04N 23/45; G03B 30/00
See application file for complete search history.

(56) References Cited

U.S. PATENT DOCUMENTS

| | | | | |
|---|---|---|---|---|
| 9,137,448 | B2* | 9/2015 | Uemura | H04N 23/62 |
| 9,355,499 | B1* | 5/2016 | Johnson | H04N 1/00209 |
| 2009/0059023 | A1* | 3/2009 | Sasaki | H04N 23/611 |
| | | | | 348/222.1 |
| 2011/0069156 | A1* | 3/2011 | Kurahashi | H04N 13/239 |
| | | | | 348/47 |
| 2014/0168476 | A1* | 6/2014 | Uemura | H04N 23/631 |
| | | | | 348/240.1 |

(Continued)

FOREIGN PATENT DOCUMENTS

JP    2019-054447 A    4/2019

*Primary Examiner* — Jared Walker
(74) *Attorney, Agent, or Firm* — Venable LLP (57) ABSTRACT

An image pickup apparatus which is capable of preventing faces of persons from being partially cut off in an image at the time of image pickup in a case where a subject includes a plurality of persons. The image pickup apparatus has a plurality of lenses with different angles of view including at least a first lens and a second lens. A first image is generated by shooting the subject through the first lens. It is determined whether or not in the subject included in the first image, a person is partially cut off. When it is determined that the person is partially cut off, the lens is switched from the first lens to the second lens with a wider angle of view than that of the first lens to shoot the subject and generate a second image.

17 Claims, 6 Drawing Sheets

(56) References Cited

U.S. PATENT DOCUMENTS

| | | | |
|---|---|---|---|
| 2014/0198230 A1* | 7/2014 | Tsutsumi | H04N 23/673 |
| | | | 348/218.1 |
| 2014/0253693 A1* | 9/2014 | Shikata | H04N 23/69 |
| | | | 348/47 |
| 2016/0323503 A1* | 11/2016 | Wada | H04N 23/61 |
| 2016/0353021 A1* | 12/2016 | Murakami | H04N 23/64 |
| 2017/0094189 A1* | 3/2017 | Ogawa | H04N 23/667 |
| 2017/0272660 A1* | 9/2017 | Ishihara | G06T 3/04 |
| 2018/0227489 A1* | 8/2018 | Ho | H04N 23/611 |
| 2018/0352168 A1* | 12/2018 | Sugaya | H04N 23/698 |
| 2020/0068143 A1* | 2/2020 | Fujisawa | H04N 23/80 |
| 2020/0304725 A1* | 9/2020 | Shiraishi | H04N 7/181 |
| 2021/0368094 A1* | 11/2021 | Li | G06N 20/00 |
| 2022/0006948 A1* | 1/2022 | Verma | H04N 23/45 |
| 2024/0143257 A1* | 5/2024 | Williams | G06F 3/14 |

* cited by examiner

IMAGE PICKUP APPARATUS THAT PERFORMS IMAGE PICKUP CONTROL FOR CASE WHERE FACES OF MULTIPLE PERSONS ARE DETECTED AT THE TIME OF IMAGE PICKUP, CONTROL METHOD THEREFOR, AND STORAGE MEDIUM

BACKGROUND OF THE INVENTION

Field of the Invention

The present invention relates to an image pickup apparatus, a control method therefor, and a storage medium, and in particular to an image pickup apparatus that performs image pickup control for case where faces of multiple persons are detected at the time of image pickup, a control method therefore, and a storage medium.

Description of the Related Art

Conventionally, a photographer shoots a subject including himself/herself ("selfie") using an image pickup apparatus such as a smartphone (see Japanese Laid-Open Patent Publication (Kokai) No. 2019-54447). To take a selfie, a photographer usually holds a smartphone and extends his/her arm to shoot a subject (including himself/herself), or shoots a subject while holding a selfie stick with a smartphone attached thereto.

When taking a selfie to shoot subject including multiple persons using one of the above methods, a problem arises because the face of a person at an edge of the angle of view is partially out of the angle of view, and hence the face is partially cut off in a resulting image (what is called "cut-off").

SUMMARY OF THE INVENTION

The present invention provides an image pickup apparatus that is capable of preventing faces of persons from being partially cut off in an image at the time of image pickup in a case where a subject includes a plurality of persons, a control method therefor, and a storage medium.

Accordingly, the present invention provides (claim 1) an image pickup apparatus equipped with a plurality of lenses with different angles of view including at least a first lens and a second lens, the image pickup apparatus comprising at least one memory that stores a set of instructions, and at least one processor that executes the instructions, the instructions, when being executed, causing the image pickup apparatus to: generate a first image by shooting a subject through the first lens; determine whether or not there is cut-off on a person in the subject included in the first image; and when it is determined that there is cut-off on the person, switch from the first lens to the second lens with a wider angle of view than that of the first lens, shoot the subject, and generate a second image.

According to the present invention, at the time of image pickup in a case where a subject includes a plurality of persons, faces of the persons are prevented from being partially cut off in an image.

Further features of the present invention will become apparent from the following description of exemplary embodiments with reference to the attached drawings.

DESCRIPTION OF THE EMBODIMENTS

The present invention will now be described in detail below with reference to the accompanying drawings showing embodiments thereof. In the following description, a smartphone is taken as an example of an image pickup apparatus according to the present invention; however, the present invention is not limited to the smartphone.

Figure 1A:
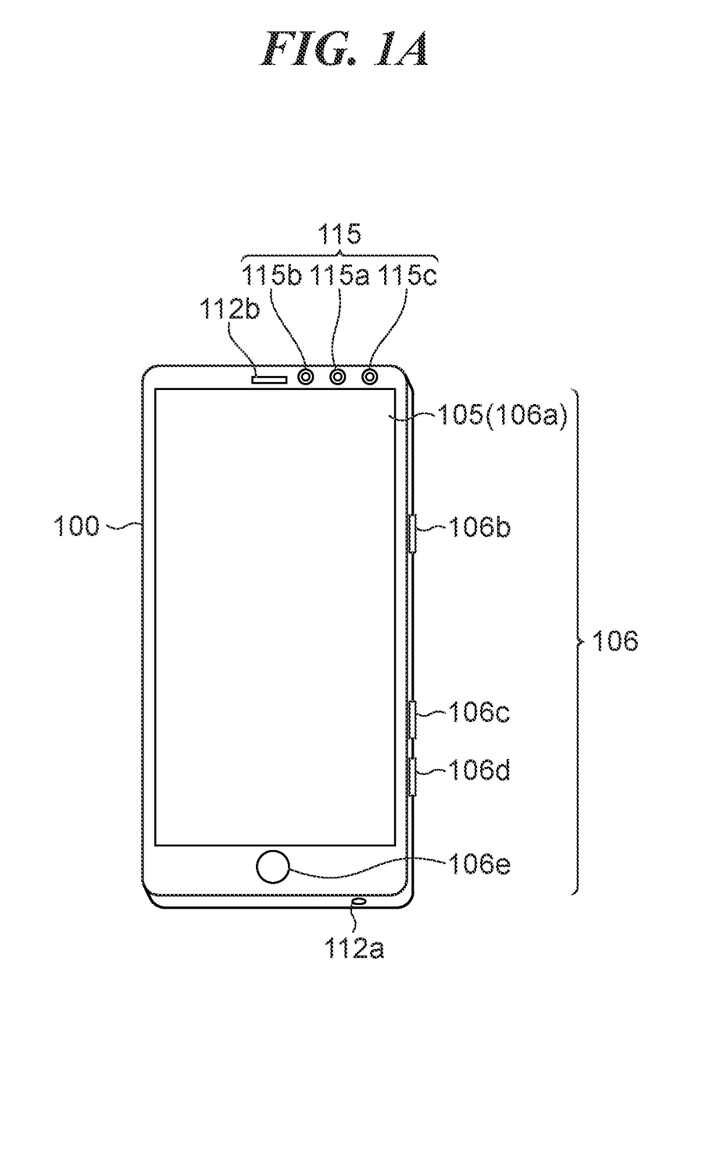
FIGS. 1A and 1B are a front view and a rear view, respectively, showing an external appearance of a smartphone according to embodiments.
Figure 1B:
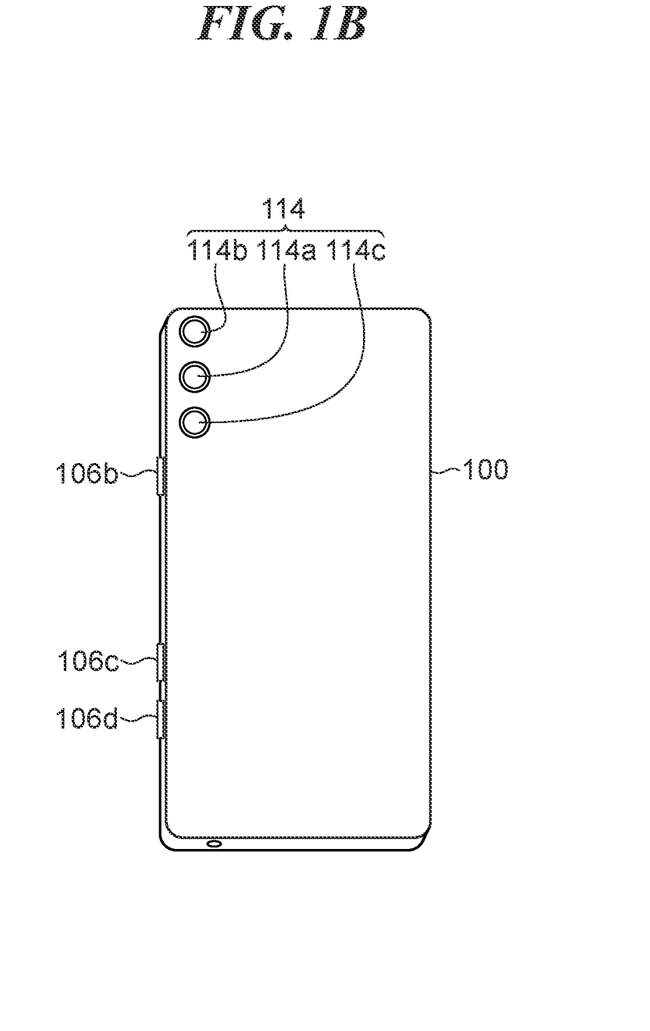

FIG. 1A is a front view showing an external appearance of a smartphone 100 according to the embodiments, and FIG. 1B is a rear view showing the external appearance of the smartphone 100.

A display 105, a touch panel 106a, a speaker 112b, a front camera 115, and a home button 106e are disposed on a front surface (a first surface) of the smartphone 100. The touch panel 106a is laid over the display 105, and the front camera 115 has a telescope lens 115a, a standard lens 115b, and an ultrawide angle lens 115c.

Figure 2:
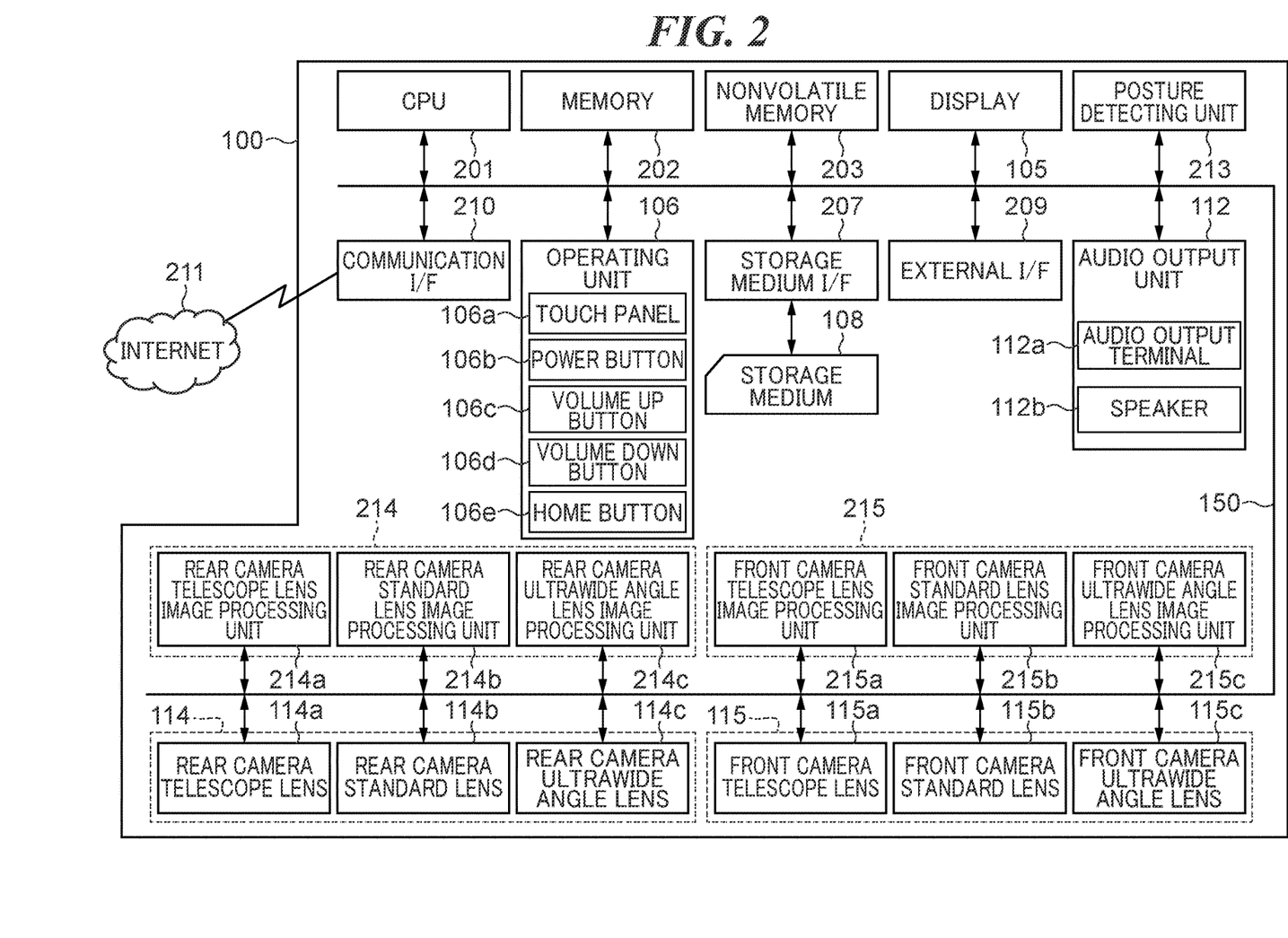
FIG. 2 is a block diagram schematically showing an arrangement of the smartphone.

An audio output terminal 112a is provided on a lower surface of the smartphone 100. A power button 106b, a volume up button 106c, and a volume down button 106d are provided on a side of the smartphone 100. A rear camera 114 is disposed on a rear surface (a second surface) of the smartphone 100. The rear camera 114 has a telescope lens 114a, a standard lens 114b, and an ultrawide angle lens 114c. Descriptions of functions and others of these components the smartphone 100 has will be given later with reference to a block diagram of FIG. 2 schematically showing an arrangement of the smartphone 100. Note that the layout of the telescope lens 115a, the standard lens 115b, and the ultrawide angle lens 115c of the front camera 115 in FIG. 1A and the layout of the telescope lens 114a, the standard lens 114b, and the ultrawide angle lens 114c of the rear camera 114 in FIG. 1B, are just shown as examples, and layouts different from them may be used.

FIG. 2 is a block diagram schematically showing the arrangement of the smartphone 100. The smartphone 100 has a CPU 201, a memory 202, a nonvolatile memory 203, a display 105, a posture detecting unit 213, an operating unit 106, a storage medium I/F 207, an external I/F 209, a communication I/F 210, and an audio output unit 112. The smartphone 100 also has the rear camera 114, the front camera 115, a rear camera image processing unit 214, and a front camera image processing unit 215. These components that the smartphone 100 has are each connected to an internal bus 150 and are configured to exchange data with one another via the internal bus 150.

The CPU 201 is a control unit that controls the overall operation of the smartphone 100 and is comprised of at least one processor or circuit. The memory 202 is, for example, a RAM. The nonvolatile memory 203 stores image data, audio data, other data, various programs for operation of the CPU 201, and so forth. The nonvolatile memory 203 is comprised of, for example, flash memory or a ROM. The CPU 201 integratedly controls the components of the smartphone 100 by developing programs stored in the nonvolatile memory 203 into a work area of the memory 202.

The display 105, which is a display device such as a liquid crystal display or an organic EL display, displays shot images, GUI screens, and so forth under the control by the CPU 201. For example, the CPU 201 generates a display control signal according to a program, and controls the components of the smartphone 100 to generate an image signal for displaying an image to be displayed on the display 105 and output it to the display 105. The display 105 displays an image in accordance with the output image signal. The display 105 is also capable of displaying a Live View image (LV image), which is being taken by the front camera 115 or the rear camera 114, on the display 105. In other words, a user can take an image while looking at an LV image displayed on the display 105.

The operating unit 106 includes the touch panel 106a, the power button 106b, the volume up button 106c, the volume down button 106d, and the home button 106e.

The touch panel 106, which is flat and laid over the display 105, detects a touch operation made on a display surface (operating surface) of the display 105 and outputs a position of contact by the touch operation as coordinate information to the CPU 201. A keyboard, an icon, and so forth that can be displayed on the display 105 function as a part of the operating unit 106 through operations on the touch panel 106a.

Note that various methods such as a resistive film method, a capacitance method, a surface acoustic wave method, an infrared method, an electromagnetic induction method, an image recognition method, and an optical sensor method can be used for the touch panel 106a. Touch operations on the touch panel 106a can be detected by either a method in which a touch is detected upon actual contact (a contact method), or a method in which a touch is detected upon approach (a non-contact method).

The power button 106b is an operating means for turning on and off the display 105, and is also an operating means for turning on and off the power to the smartphone 100 in response to being depressed for a certain period of time (for example, three seconds) (what is called "holding down"). The volume up button 106c and the volume down button 106d are operating means for adjusting the volume of sound to be output from the audio output unit 112. When the volume up button 106c is depressed, the volume of output sound increases, and when the volume down button 106d is depressed, the volume of output sound decreases. In a shooting standby mode when the camera is in use, the volume up button 106c and/or the volume down button 106d functions as a shutter button that issues an instruction to perform shooting. Note that the user of the smartphone 100 can configure settings, for example, on an operation of simultaneous depression of the power button 106b and the volume down button 106d, and on an operation of quick repeated depression of the volume down button 106d, such that specific functions are performed.

The home button 106e is an operating means for displaying a home screen, which is a startup screen of the smartphone 100, on the display 105. By depressing the home button 106e in a case where various applications have been started and run in the smartphone 100, the various applications that are running are temporarily closed and the home screen is displayed. Note that although in the embodiment, the home button 106e is presented as a button that can be physically depressed, the present invention is not limited to this. The home button 106e may be, for example, a button that is displayed on the display 105 and caused to function similarly to the physical home button 106e by touch operations.

The audio output unit 112 includes the audio output terminal 112a and the speaker 112b. The speaker 112b outputs sounds of video and music data, operating sounds, ring tones, various notification sounds, and so forth. The audio output terminal 112a is a terminal that outputs sound to headphones, earphones, external speakers, and so forth (what is called a "headphone jack"). When no audio output speaker such as a headphone is connected to the audio output terminal 112a, sound is output from the speaker 112b. Note that sound may be output through wireless communication or the like, and for example, sound is output to speakers or earphones (headphones) through Bluetooth (registered trademark).

A storage medium 108 is, for example, a memory card mounted on a main body of the smartphone 100 or an internal storage incorporated in the smartphone 100. The storage medium I/F 207 is an interface for reading data from the storage medium 108 and writing data on the storage medium 108 under the control of the CPU 201. The external I/F 209 is an interface for communicateably connecting the smartphone 100 and external equipment together via a connecting cable or via wireless communication such that they can communicate with each other to input/output image signals, audio signals, and so forth. The communication I/F 210 is an interface for connecting to a communication network such as the Internet 211.

The posture detecting unit 213 detects a posture of the smartphone 100 with respect to a gravitational direction, and a tilt and turn of the smartphone 100 with respect to each of yaw, roll, and pitch axes. Based on detection signals from the posture detecting unit 213, whether the smartphone 100 is held in horizontal position or held in vertical position, whether the surface of the display 105 faces upward, faces downward, or is diagonally positioned, and so forth can be determined. At least one of sensors such as an acceleration sensor, a gyro sensor, a geomagnetic sensor, an orientation sensor, and an altitude sensor can be used as the posture detecting unit 213, and a plurality of them can also be used in combination.

In the rear camera 114, an image pickup device is disposed for each of the telescope lens 114a, the standard lens 114b, and the ultrawide angle lens 114c. Namely, the rear camera 114 is a collection of three cameras capable of taking images through the respective lenses.

In the rear camera 114, the focal length of the telescope lens 114a is longer than that of the standard lens 114b. Thus, by using the telescope lens 114a, it is possible to take an image of a subject farther away in an enlarged manner than in the case where the standard lens 114b is used. Moreover, the focal length of the ultrawide angle lens 114c is shorter than that of the standard lens 114b. Thus, by using the ultrawide angle lens 114c, it is possible to take an image in a wider range than in the case where the standard lens 114b is used. Namely, the focal length becomes shorter, and accordingly, the angle of view becomes wider in the following order: the telescope lens 114a, the standard lens 114b, and the ultrawide angle lens 114c.

Note that in the embodiment, the telescope lens 114a, the standard lens 114b, and the ultrawide angle lens 114c are lenses each having a zooming function and capable of continuously changing the angle of view in photography in a range between the telephoto side and the wide angle side. However, this is not limitative, but the telescope lens 114a, the standard lens 114b, and the ultrawide angle lens 114c may be configured to optically zoom at the same magnification in aspect ratio at a predetermined magnification, or their magnifications may be changed by the user.

In the front camera 115, an image pickup device is disposed for each of the telescope lens 115a, the standard lens 115b, and the ultrawide angle lens 115c. Namely, the front camera 115 is a collection of three cameras capable of taking images through the respective lenses.

In the front camera 115, the focal length of the telescope lens 115a is longer than that of the standard lens 115b. Thus, by using the telescope lens 115a, it is possible to take an image of a subject farther away in an enlarged manner than in the case where the standard lens 115b is used. Moreover, the focal length of the ultrawide angle lens 115c is shorter than that of the standard lens 115b. Thus, by using the ultrawide angle lens 115c, it is possible to take an image in a wider range than in the case where the standard lens 115b is used. Namely, the focal length becomes shorter, and accordingly, the angle of view becomes wider in the following order: the telescope lens 115a, the standard lens 115b, and the ultrawide angle lens 115c.

Note that in the embodiment, the telescope lens 115a, the standard lens 115b, and the ultrawide angle lens 115c are lenses each having a zooming function and capable of continuously changing the angle of view in photography in a range between the telephoto side and the wide angle side. However, this is not limitative, but the telescope lens 115a, the standard lens 115b, and the ultrawide angle lens 115c may be configured to optically zoom at the same magnification in aspect ratio at a predetermined magnification, or their magnifications can be changed by the user.

Note that the smartphone 100 is capable of simultaneously taking images through all of the telescope lens 114a, the standard lens 114b, the ultrawide angle lens 114c, the telescope lens 115a, the standard lens 115b, and the ultrawide angle lens 115. However, this is not limitative, but the smartphone 100 may simultaneously take images through two to five lenses selected from among the six lenses and also take images through one lens.

Both of LV images obtained through the rear camera 114 and LV images obtained through the front camera 115 can be displayed on the display 105. Through operation on the touch panel 106a, the user can select a lens by which an image to be displayed on the display 105 is taken. For example, by selecting the telescope lens 114a, an image enlarged to a larger extent than an image taken by the standard lens 114b can be displayed on the display 105. By selecting the standard lens 114b, an image in a wider angle than an image taken by the telescope lens 114a and enlarged to a larger extent than an image taken by the ultrawide angle lens 114c, can be displayed on the display 105. By selecting the ultrawide angle lens 114c, an image in a wider angle than an image taken by either the telescope lens 114a or the standard lens 114b can be displayed on the display 105. Note that in general, the rear camera 114 is used to take an image of a scene in front of oneself, and the front camera 115 is used to take an image of a photographer himself/herself (selfie).

The rear camera image processing unit 214 performs various types of image processing, a subject recognition process, and so forth on images, which are taken by the rear camera 114, under the control of the CPU 201. The rear camera image processing unit 214 has a telescope lens image processing unit 214a, a standard lens image processing unit 214b, and an ultrawide angle lens image processing unit 214c. The telescope lens image processing unit 214a performs various types of image processing on images taken through the telescope lens 114a. Likewise, the standard lens image processing unit 214b performs various types of image processing on images taken through the standard lens 114b, and the ultrawide angle lens image processing unit 214c performs various types of image processing on images taken through the ultrawide angle lens 114c.

The front camera image processing unit 215 performs various types of image processing, a subject recognition process, and so forth on images, which are taken by the front camera 115, under the control of the CPU 201. The front camera image processing unit 215 has a telescope lens image processing unit 215a, a standard lens image processing unit 215b, and an ultrawide angle lens image processing unit 215c. The telescope lens image processing unit 215a performs various types of image processing on images taken through the telescope lens 115a. Likewise, the standard lens image processing unit 215b performs various types of image processing on images taken through the standard lens 115b, and the ultrawide angle lens image processing unit 215c performs various types of image processing on images taken through the ultrawide angle lens 115c.

Note that although in the present embodiment, respective image processing units are provided for the three lenses of the rear camera 114, the present invention is not limited to this arrangement. For example, one image processing unit may be provided for two of the three lenses, and one image processing unit may be provided for the other one lens. Alternatively, one image processing unit may be provided for the three lenses. The front camera image processing unit 215 may also have the similar arrangement.

The rear camera image processing unit 214 and the front camera image processing unit 215 may perform various types of image processing on images stored in the nonvolatile memory 203 and the storage medium 108, image signals obtained through the external I/F 209, images obtained through the communication I/F 210, and so forth. Examples of the image processing performed by the rear camera image processing unit 214 and the front camera image processing unit 215 include an A/D conversion process, a D/A conversion process, an image data encoding process, a compression process, a decoding process, an enlargement/reduction process (resizing), a noise reduction process, and a color conversion process.

Note that the rear camera image processing unit 214 and the front camera image processing unit 215 may be comprised of dedicated circuit blocks for performing specific image processing. Alternatively, the rear camera image processing unit 214 and the front camera image processing unit 215 may be integrated into one processing block, and this processing block may be configured to carry out all of various processes on images obtained by the respective lenses through parallel processing or time-sharing processing. Moreover, depending on types of image processing, the CPU 201 may be configured to perform image processing in accordance with programs in place of the rear camera image processing unit 214 and the front camera image processing unit 215.

Figure 3:
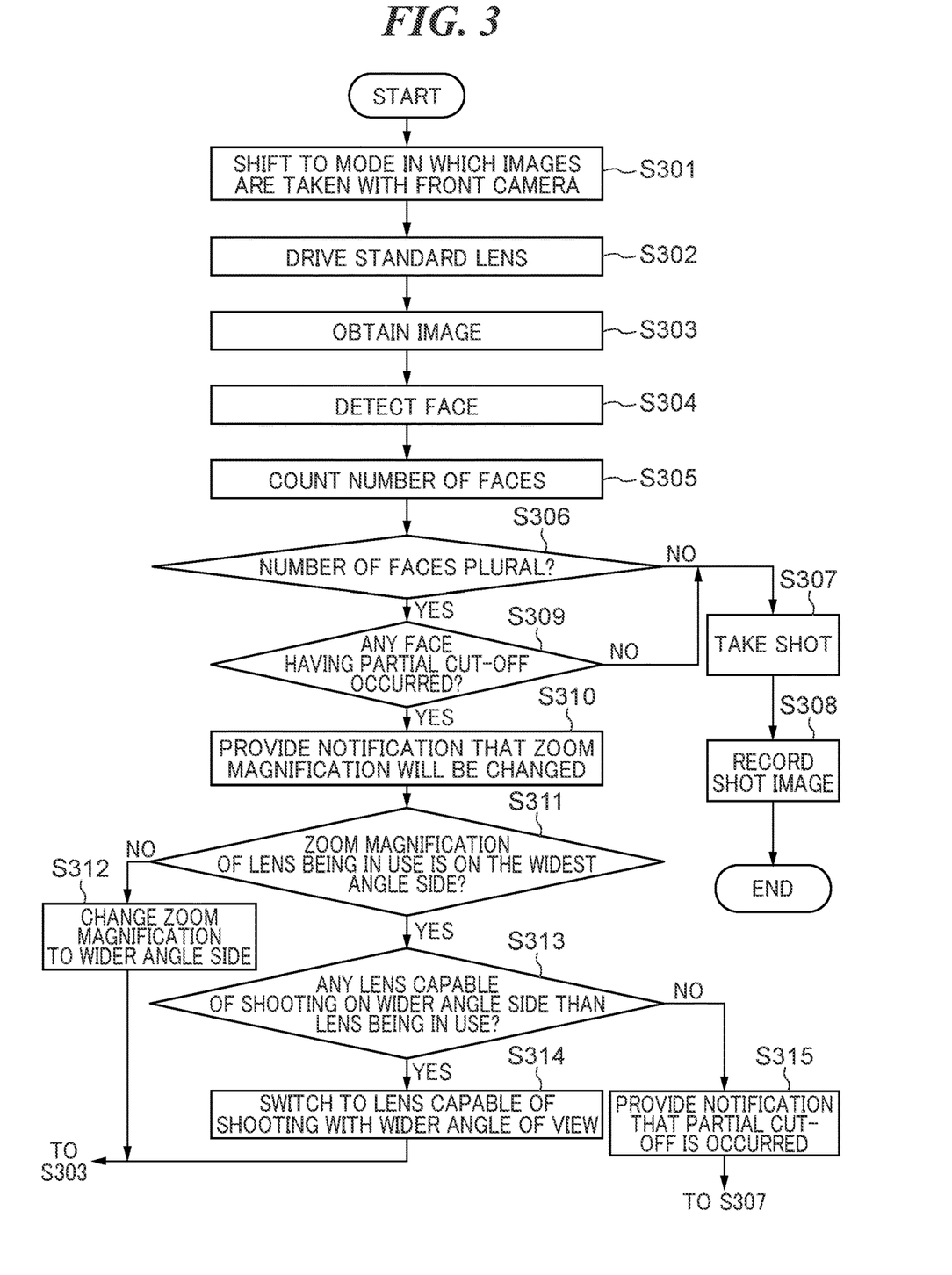
FIG. 3 is a flowchart of image pickup control according to the first embodiment.

A description will now be given of image pickup control using the front camera 115. FIG. 3 is a flowchart of image pickup control using the front camera 115 according to the first embodiment. Processes (steps) represented by "S" numbers in the flowchart of FIG. 3 are implemented by the CPU 201 developing predetermined programs stored in the nonvolatile memory 203 into the memory 202 to integratedly control the operation of the components of the smartphone 100.

In S301, in response to a user operation, the CPU 201 switches (shifts) a shooting mode to a mode in which images are taken with the front camera 115. In S302, the CPU 201 drives a lens that is set as a default lens in the front camera 115. It is assumed here that the standard lens 115b is set as the default lens. In S303, the CPU 201 obtains an image (an LV image) using the standard lens 115b of the front camera 115. In S304, the CPU 201 causes the standard lens image processing unit 214b to detect (areas of) faces of persons from the image obtained in S303. Note that face detection can be performed using a known art, and hence detailed description thereof is omitted here.

In S305, the CPU 201 causes the standard lens image processing unit 214b to count the number of faces detected in S304. In S306, the CPU 201 causes the standard lens image processing unit 214b to determine whether or not the number of faces counted in S305 is plural. When it is determined that the number of faces counted is not plural (NO in S306), the CPU 201 proceeds the process to S307. In S307, the CPU 201 takes an image with the front camera 115. Then, in S308, the CPU 201 writes and records the shot image on the storage medium 108 via the storage medium I/F 207, and ends the present process.

When it is determined in S306 that the number of faces counted is plural (YES in S306), the CPU 201 proceeds the process to S309. In S309, the CPU 201 causes the standard lens image processing unit 214b to determine whether or not there is any face having "partial cut-off" occurred out of the plurality of faces detected in S304 (whether or not at least one face is partially cut off, that is, at least one face has a missing part). When it is determined that there is no face having partial cut-off occurred (NO in S309), the CPU 201 proceeds the process to S307, and when it is determined that there is a face having partial cut-off occurred (YES in S309), the CPU 201 proceeds the process to S310.

In S310, the CPU 201 displays, on the display 105, a notification indicating that the zoom magnification will be changed to a magnification on the wide angle side. Then, in S311, the CPU 201 determines whether or not the zoom magnification of the lens being in use is a magnification on the widest angle side. In a case where the determination in S311 is made for the first time, an image was taken by the standard lens 115b, and hence the CPU 201 determines whether or not the zoom magnification of the standard lens 115b is a magnification on the widest angle side.

When determining that the zoom magnification of the lens being in use is not a magnification on the widest angle side (NO in S311), the CPU 201 proceeds the process to S312. In S312, the CPU 201 changes the zoom magnification of the lens to a magnification on a wider angle side, and after that, the CPU 201 return the process to S303. Thus, the processes in S303 and the subsequent steps are carried out again based on the image obtained in S303, and hence, for example, even if the number of faces in the angle of view increases or decreases between S303 last time and S303 this time, a process that deals with the increase or decrease can be carried out.

When determining in S311 that the zoom magnification of the lens being in use is a magnification on the widest angle side (YES in S311), the CPU 201 proceeds the process to S313. In S313, the CPU 201 determines whether or not there is a lens capable of taking wide angle shots as compared to the lens being in use. When determining that there is a lens capable of taking wide angle shots as compared to the lens being in use (YES in S313), the CPU 201 proceeds the process to S314. When determining that there is no lens capable of taking wide angle shots as compared to the lens being in use (NO in S313), the CPU 201 proceeds the process to S315.

In S314, the CPU 201 changes the lens for use in image pickup from the lens being in use to the lens capable of taking wider angle shots, and then returns the process to S303. In S315, the CPU 201 displays, on the display 105, a notification indicating that at least one face has partial cut-off occurred (alarm screen), to notify the user of the partial cut-off, and then proceeds the process to S307. Note that the notification in S315 may be provided using light (when the smartphone 100 has a light-emitting unit) and/or sound (output from the speaker 112b) as a substitute for or in combination with the display on the display 105.

As described above, in the image pickup control according to the first embodiment, the zoom magnification of the lens being in use is automatically adjusted, and/or the lens being in use is automatically replaced with the lens capable of taking wider angle shots so that the zoom magnification can be a maximum magnification at which a face can fit in the angle of view without being partially cut off. This prevents the face of a subject (person) from being partially cut off at the time of image pickup.

The image pickup control in the case where an image is taken using the front camera 115 has been described. Likewise, in the case where an image is taken using the rear camera 114, the same image pickup control can be performed to prevent the face of a subject (person) from being partially cut off at the time of image pickup.

In the embodiment described above, each of the rear camera 114 and the front camera 115 is configured to have a plurality of lenses with different angles of view. A description will now be given of image pickup control in a case where each of the rear camera 114 and the front camera 115 is comprised of a monocular lens capable of optically zooming.

Figure 4:
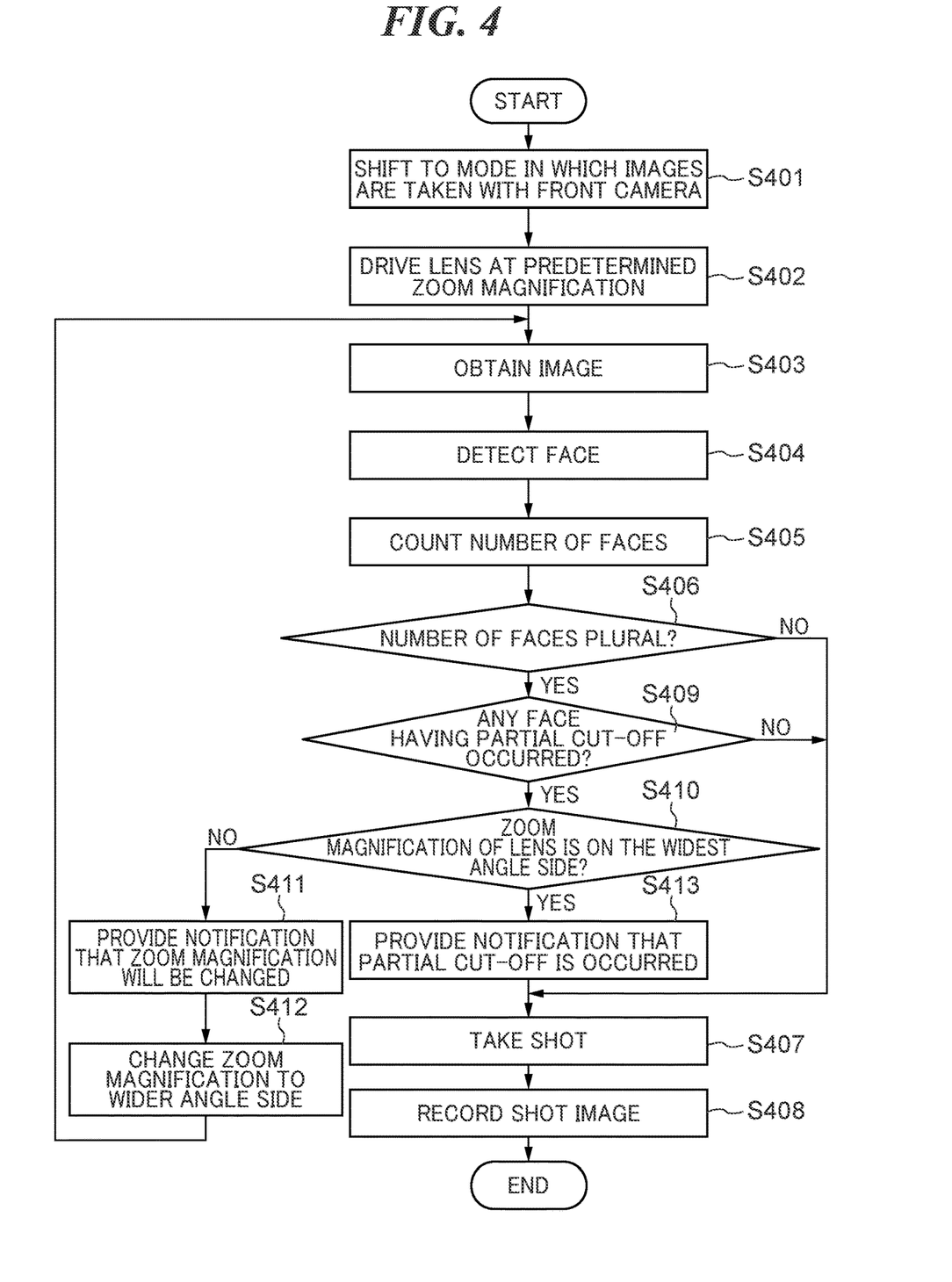
FIG. 4 is a flowchart of image pickup control according to the second embodiment.

FIG. 4 is a flowchart of the image pickup control according to a second embodiment using the front camera 115. In the present embodiment, it is assumed that the front camera 115 has only the standard lens 115b for the convenience of explanation. Processes (steps) represented by "S" numbers in the flowchart of FIG. 4 are implemented by the CPU 201 developing predetermined programs stored in the nonvolatile memory 203 into the memory 202 to integratedly control the operation of the components of the smartphone 100.

The process in S401 is the same as the process in S301 in the flowchart of FIG. 3, and hence description thereof is omitted. In S402, the CPU 201 sets the standard lens 115b at a zoom magnification allowed to be changed toward an intermediate or wide angle side (that is, a zoom magnification on the telephoto side), and drives the standard lens 115b. The processes in S403 to S409 are the same as the processes in S303 to S309 in the flowchart of FIG. 3, and hence descriptions thereof are omitted.

When it is determined in S409 that there is at least one face having partial cut-off occurred (YES in S409), the CPU 201 proceeds the process to S410. In S410, the CPU 201 determines whether the zoom magnification of the standard lens 115b is a magnification on the widest angle side. When determining that the zoom magnification of the standard lens 115b is not a magnification on the widest angle side (NO in S410), the CPU 201 proceeds the process to S411.

In S411, the CPU 201 displays, on the display 105, a notification indicating that the zoom magnification of the standard lens 115b will be changed to a magnification on a wider angle side. Then, in S412, the CPU 201 changes the zoom magnification of the standard lens 115b to a magnification on a wider angle side than the present zoom magnification by a predetermined magnification, and then returns the process to S403.

When determining in S410 that the zoom magnification of the standard lens 115b is a magnification on the widest angle side (YES in S410), the CPU 201 proceeds the process to S413. The process in S413 is the same as the process in S315 in the flowchart of FIG. 3, and hence description thereof is omitted. After carrying out the process in S413, the CPU 201 proceeds the process to S407. The processes in S407 and the subsequent step S408 are the same as the processes in S307 and S308 in the flowchart of FIG. 3, and hence descriptions thereof are omitted.

As described above, in the image pickup control according to the second embodiment, the zoom magnification of the lens is automatically adjusted so that the zoom magnification can be a maximum magnification at which a face can fit in the angle of view without being partially cut off, which prevents the face of a subject (person) from being partially cut off at the time of image pickup. The image pickup control in the case where an image is taken using the front camera 115 has been described. Likewise, in the case where an image is taken using the rear camera 114, the same image pickup control can be performed to prevent the face of a subject (person) from being partially cut off at the time of image pickup.

Figure 5A:
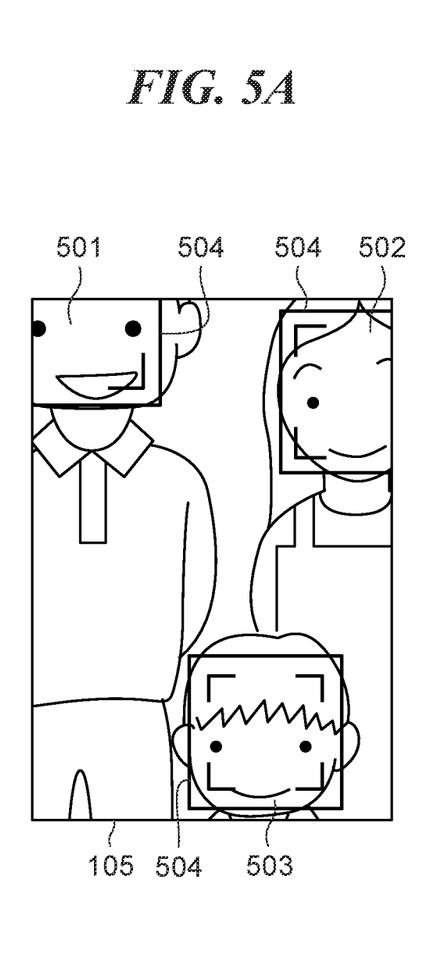
FIGS. 5A to 5C are views showing examples of images obtained by the image pickup control in FIG. 3 and FIG. 4.
Figure 5B:
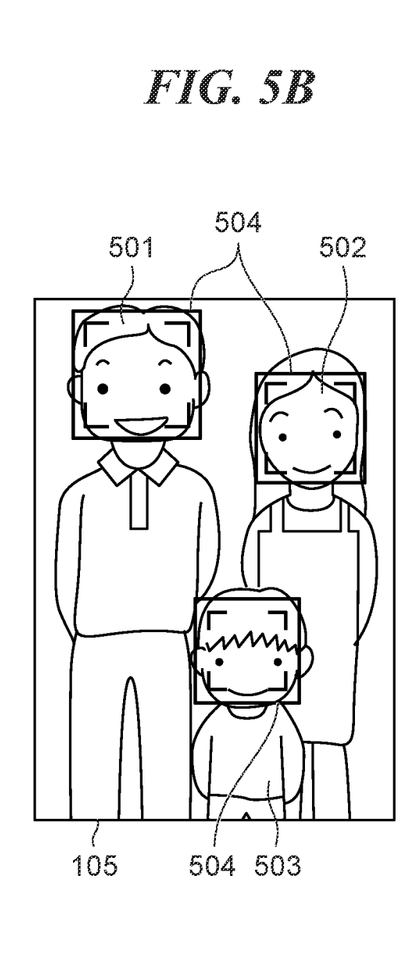

FIG. 5A and FIG. 5B are views showing examples of transition of images obtained by the image pickup control in accordance with the flowcharts of FIG. 3 and FIG. 4. FIG. 5A shows an example of an LV image in which cut-off is occurred on faces of persons in S309 (or S409). The CPU 201 instructs an image processing unit for a lens being in use to display face detection frames 504 correspondingly to faces detected in the face detection process in S304 (or S404), on the display 105 in a manner being superimposed on the LV image. When, for example, a part of the face detection frames 504 is not displayed on the display 105, the CPU 201 determines that partial cut-off is occurred on a face.

In FIG. 5A, faces of persons 501 and 502 are partially cut off while a face of a person 503 is not cut off. When it is determined in S309 (or S409) that a face is partially cut off, the zoom magnification is changed to a zoom magnification on the wide angle side in S312 (or S412), or the lens is replaced with a lens capable of taking wider angle shots in S314, so that an image in FIG. 5B can be obtained. Namely, FIG. 5B shows an example of an LV image obtained by changing the angle of view to the wide angle side from the LV image in FIG. 5A. In FIG. 5B, there is no face that is partially cut off.

In the above-described examples illustrated in FIG. 3, FIG. 4, FIG. 5A, and FIG. 5B, whether or not there is any face that is partially cut off is determined to take an image in which no face is partially cut off; however, a target of the determination of cut-off may be the whole body of a person, which makes it possible to obtain an image in which the whole body is not partially cut off.

Figure 5C:
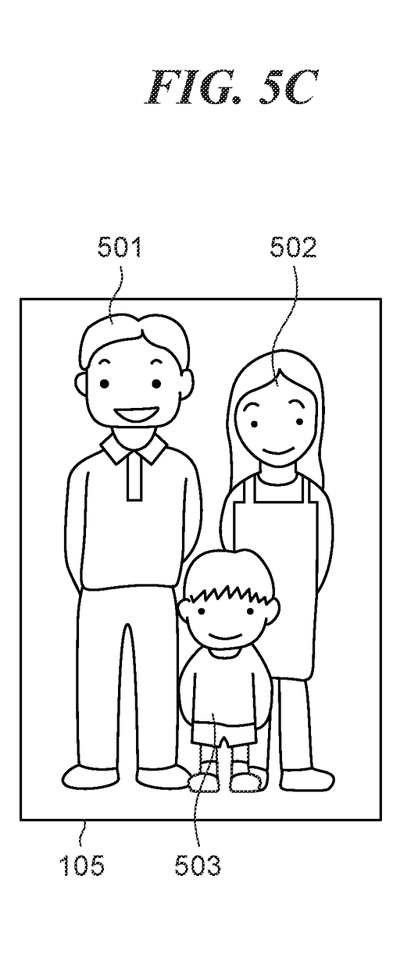

FIG. 5C shows an example of an image with no cut-off on the determination target obtained by setting the determination target of cut-off as the whole body of a person. In the case where the determination target of cut-off is the whole body of a person, the CPU 201 detects (the region of) the whole body of a person in S309 (or S409). The whole body of a person can be detected using a well-known method. For example, a method in which the face of a person is detected first, and then the whole body is estimated by pattern matching or the like based on the detected face, or a method described in Japanese Laid-Open Patent Publication (Kokai) No. 2019-54447, can be used to detect the whole body of a person. After that, by adjustment of the zoom magnification of the lens and/or switch of the lenses, the magnification to be used is changed to the wide angle side, so that the estimated whole body can fit in the angle of view. As a result, an image in which the whole body of a person is not cut off is obtained as shown in FIG. 5C.

Although the present invention has been described in detail by way of the preferred embodiments, the present invention should not be limited to the specific embodiments described above. The present invention also encompasses various forms without departing from the spirits of the present invention. Moreover, the embodiments described above are merely illustrative embodiments of the present invention, and the embodiments may be used in combination as appropriate.

For example, the user may set, via the operating unit 106, the number of persons (faces) to be detected from a picked-up image as the number of persons who are going to be subjects, and the CPU 201 may determine that partial cut-off is occurred on a person (face) when the number of persons (faces) counted in S305 or S405 is smaller than the set number of persons (faces) to be detected. Namely, the determination is made based on the premise that when the face of a person is partially cut off and does not entirely fit in the angle of view, all of elements required to recognize the face of the person do not exist within the angle of view, and hence the face of the person is not detected as a face of a targeted person. In this case, the determinations in S306, S309, S406, and S409 are not performed. In this case, the CPU 201 compares the counted number of persons with the set number of persons to be detected. When the counted number of persons is smaller than the set number of persons to be detected, the CPU 201 determines that there is a person (face) who is partially cut off, and carries out the processes in S310 and the subsequent steps. When the counted number of persons is equal to or greater than the set number of persons to be detected, the CPU 201 determines that a person (face) has no cut-off portion, and carries out the processes in S307 and the subsequent steps. Thus, even when the number of persons is not plural but singular, whether or not a face is partially cut off can be determined, and shooting can be prevented from being performed with a face partially cut off.

Moreover, although in the embodiments described above, it is assumed that each of the telescope lens 114a, the standard lens 114b, and the ultrawide angle lens 114c in the rear camera 114 has a zooming function, at least one of these lenses may be a single-focus lens. The same holds for the front camera 115. When the single-focus lens is used, the result of the determination in S311 is always positive (YES).

Furthermore, although in the embodiments described above, it is assumed that whenever cut-off is occurred, the process in which the zoom magnification is automatically changed to the wide angle side is carried out; however, this function of the smartphone 100 may be enabled or disabled (may be set enabled or disabled) through user operation on the operating unit 106.

In addition, although in the embodiments described above, the present invention is applied to the smartphone, the present invention can be applied to any electronic devices as long as they have a display and a camera. Thus, the present invention can be applied to, for example, a tablet PC, a PDA, and a digital camera. It goes without saying that depending on electronic devices to which the present invention can be applied, arrangements of members and others constituting operating means for operating the electronic devices may be different from those of the operating unit 106 illustrated in FIG. 2. Moreover, as for an arrangement relating to image output from an electronic device according to the present invention, an external monitor may be used as a display (display device). In this case, the electronic device may have an interface for outputting image signals to be displayed on the display.

Other Embodiments

Embodiment(s) of the present invention can also be realized by a computer of a system or apparatus that reads out and executes computer executable instructions (e.g., one or more programs) recorded on a storage medium (which may also be referred to more fully as a non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-172318, filed on Oct. 21, 2021, which is hereby incorporated by reference herein in its entirety.

What is claimed is:

1. An image pickup apparatus equipped with a plurality of lenses with different angles of view including at least (a) a first lens having a zooming function that varies a magnification of the first lens between a wide-angle end and a telephoto end and (b) a second lens, the image pickup apparatus comprising:
at least one memory that stores a set of instructions; and
at least one processor that executes the instructions, the instructions, when being executed, causing the image pickup apparatus to:
(1) display a first image that is shot through the first lens;
(2) detect a subject from the first image;
(3) determine whether or not there is cut-off on a person in the subject detected in the first image;
(4) in response to a predetermined user operation, switch between (a) display of the first image that is shot through the first lens and (b) display of a second image that is shot through the second lens and that has a wider angle of view than the first image; and
(5) when it is determined that there is cut-off on the person, (a) automatically switch from the display of the first image to the display of the second image without the predetermined user operation, in a case where the first lens is in a predetermined zooming state, and (b) automatically perform zooming using the zooming function of the first lens by varying the magnification of the first lens to be closer to the wide-angle end without a user operation for zooming and display a third image that is shot using the varied magnification of the first lens, in a case where the first lens is not in the predetermined zooming state.

2. The image pickup apparatus according to claim 1, wherein the at least one processor further executes the instructions to write the shot second image into a recording medium.

3. The image pickup apparatus according to claim 1, wherein the predetermined zooming state is a state in which the magnification of the first lens is at the wide-angle end.

4. The image pickup apparatus according to claim 1, wherein the at least one processor further executes the instructions to detect a face or whole body of a person from the first image, and
wherein if an area of the detected face or whole body has a missing part, it is determined that there is cut-off on the person.

5. The image pickup apparatus according to claim 1, wherein the at least one processor further executes the instructions to:
(1) set the number of persons to be included in the subject; and
(2) count the number of persons in the subject included in the first image, and
wherein if the counted number of persons is smaller than the set number of persons, it is determined that there is cut-off on the person.

6. The image pickup apparatus according to claim 1, further comprising a display device configured to display the first image or the second image.

7. The image pickup apparatus according to claim 6, wherein the at least one processor further executes the instructions to display predetermined information on the display device when it is determined that there is cut-off on the person.

8. The image pickup apparatus according to claim 6, wherein the plurality of lenses is disposed on the same surface as the display device.

9. The image pickup apparatus according to claim 1, further comprising a light-emitting device,
wherein the at least one processor further executes the instructions to cause the light-emitting device to emit light when it is determined that there is cut-off on the person.

10. The image pickup apparatus according to claim 1, further comprising an audio output device,
wherein the at least one processor further executes the instructions to cause the audio output device to output sound when it is determined that there is cut-off on the person.

11. The image pickup apparatus according to claim 1, wherein the at least one processor further executes the instructions to set to enable or disable switching from the first lens to the second lens.

12. The image pickup apparatus according to claim 1, wherein the at least one processor further executes the instructions to make the determination when there is a plurality of persons as a subject included in the first image.

13. A control method for an image pickup apparatus equipped with a plurality of lenses with different angles of view including at least (a) a first lens having a zooming function that varies a magnification of the first lens between a wide-angle end and a telephoto end and (b) a second lens, the control method comprising:

displaying a first image that is shot through the first lens;
detecting a subject from the first image;
determining whether or not there is cut-off on a person in the subject detected in the first image;
in response to a predetermined user operation, switching between (a) display of the first image that is shot through the first lens and (b) display of a second image that is shot through the second lens and that has a wider angle of view than the first image; and
when it is determined that there is cut-off on the person, (a) automatically switching from the display of the first image to the display of the second image without the predetermined user operation, in a case where the first lens is in a predetermined zooming state, and (b) automatically performing zooming using the zooming function of the first lens by varying the magnification of the first lens to be closer to the wide-angle end without a user operation for zooming and displaying a third image that is shot using the varied magnification of the first lens, in a case where the first lens is not in the predetermined zooming state.

14. A non-transitory storage medium storing a computer-executable program for causing a computer to execute a control method for an image pickup apparatus equipped with a plurality of lenses with different angles of view including at least (a) a first lens having a zooming function that varies a magnification of the first lens between a wide-angle end and a telephoto end and (b) a second lens, the control method comprising:

displaying a first image that is shot through the first lens;
detecting a subject from the first image;
determining whether or not there is cut-off on a person in the subject detected in the first image;
in response to a predetermined user operation, switching between (a) display of the first image that is shot through the first lens and (b) display of a second image that is shot through the second lens and that has a wider angle of view than the first image; and
when it is determined that there is cut-off on the person, (a) automatically switching from the display of the first image to the display of the second image without the predetermined user operation, in a case where the first lens is in a predetermined zooming state, and (b) automatically performing zooming using the zooming function of the first lens by varying the magnification of the first lens to be closer to the wide-angle end without a user operation for zooming and displaying a third image that is shot using the varied magnification of the first lens, in a case where the first lens is not in the predetermined zooming state.

15. The image pickup apparatus according to claim 1, wherein the at least one processor further executes the instructions to:
(1) count the number of persons included in the first image;
(2) when the counted number of persons is not less than a predetermined number, determine whether or not there is cut-off on a person in the first image, and when it is determined that there is cut-off on the person, switch to the display of the second image or display of the third image; and
(3) when the counted number of persons is less than the predetermined number, not switch to the display of the second image or the display of the third image, regardless of whether it is determined that there is cut-off on a person in the first image.

16. The image pickup apparatus according to claim 15, wherein the predetermined number is two.

17. The image pickup apparatus according to claim 6, wherein the first lens and the second lens are arranged on a face of the image pickup apparatus on which the display device is located.

* * * * *